May 12, 1959

G. E. HENNING 2,885,738

METHODS OF ABSORBING AND RETAINING EXPANDING
MEDIA IN PLASTIC MATERIALS
Filed Dec. 29, 1955

INVENTOR.
G. E. HENNING
BY
ATTORNEY

United States Patent Office 2,885,738
Patented May 12, 1959

2,885,738

METHODS OF ABSORBING AND RETAINING EXPANDING MEDIA IN PLASTIC MATERIALS

George E. Henning, Baltimore, Md., assignor to Western Electric Company, Incorporated, New York, N.Y., a corporation of New York Application December 29, 1955, Serial No. 556,262

10 Claims. (Cl. 18—59)

This invention relates to methods of absorbing and retaining expanding media in thermoplastic materials, and more particularly to methods of absorbing and retaining a liquefied, normally-gaseous expanding medium into solid granules of a thermoplastic resin for use in the manufacture of cellular plastic products.

Heretofore in the manufacture of insulated conductors, thermoplastic material, such as polyvinyl halide compounds, nylon, polyethylene, or the like, have been extruded as solid coverings upon continuous conductors of indefinite lengths. Polyethylene in particular possesses excellent electrical properties, having a relatively low dielectric constant, low power factor and a very high dielectric strength. It is also impermeable to water and water vapor.

For certain purposes, it is desirable to manufacture insulated conductors having insulating coverings which include or consist of organic plastic materials in a cellular state. It has been suggested heretofore to introduce a gaseous material into a plastic, such as polystyrene, and to extrude the resulting mixture in a cellular state in the form of thick slabs or logs. However, the methods heretofore known for extruding organic plastic materials in such shapes are not satisfactory for extruding such materials upon conductors in the form of insulating coverings having cellular structures.

An object of the invention is to provide new and improved methods of absorbing and retaining expanding media in thermoplastic materials.

A further object of the invention is to provide new and improved methods of absorbing and retaining a liquefied, normally-gaseous expanding medium into solid granules of a thermoplastic resin for use in the manufacture of cellular plastic products.

Still another object of the invention is to provide new and improved methods of forming insulating coverings of cellular plastic materials upon electrical conductors.

A method illustrating certain features of the invention may include heating under pressure granules of a thermoplastic resin with a liquefied, normally-gaseous expanding medium to cause a predetermined amount of the liquefied expanding medium to be absorbed into the solid granules. The mixture including the plastic compound with the liquefied medium absorbed therein is cooled to a temperature below the boiling point of the expanding medium at atmospheric pressure to cause the expanding medium to be retained in the plastic compound. Thereafter, the cooled mixture may be fed into a plastics extruder and extruded into a predetermined shape whereupon the absorbed expanding medium causes the extruded material to expand into a cellular product.

A complete understanding of the invention may be obtained from the following detailed description of a method forming a specific embodiment thereof, when read in conjunction with the appended drawing, in which.

Figure 1:
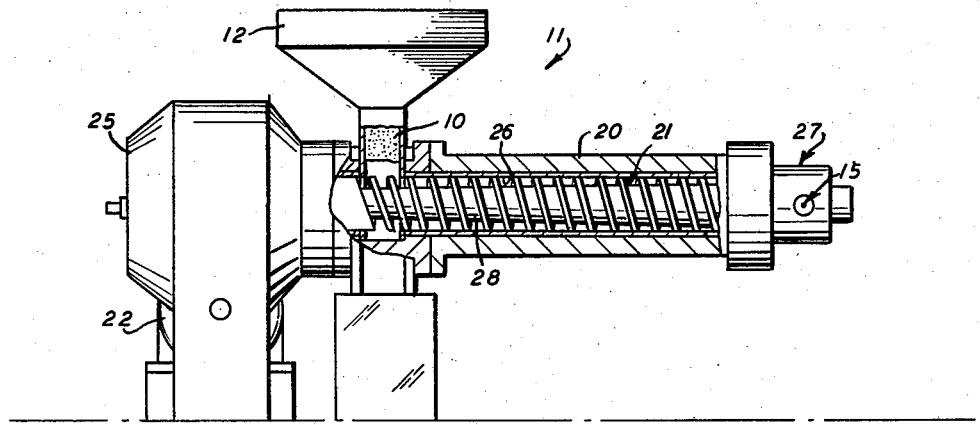
Fig. 1 is a side elevation, with parts thereof broken away, of an extruder suitable for carrying out certain steps of methods embodying the invention.

Referring now in detail to the drawings, a suitable thermoplastic compound 10 (Fig. 1) such as polyethylene, is fed into the entrance end of an extruder, indicated generally at 11, from a feed hopper 12. The plastic compound 10 may be initially in the form of granules, pellets, or the like, a supply of which is maintained within the feed hopper 12. The extrusion apparatus is designed to form continuously an insulated conductor 15 (Fig. 3) which includes an insulating covering 16 of the plastic compound around a filamentary metallic conductor 17, which may be initially bare or may have a textile or other covering thereon.

The extruder 11 includes an extrusion cylinder 20 in which a stock screw 21 is mounted rotatably. The extrusion cylinder 20 and the stock screw 21 may be equipped with conventional means (not shown) for controlling the temperatures of those members. The stock screw 21 is rotated by a conventional extruder drive including an electric motor 22, which rotates the stock screw through a suitable gear train (not shown) mounted within a housing 25. The stock screw 21 advances the plastic compound 10 through a central bore 26 within the extrusion cylinder 20 from the end where the compound 10 in the hopper 12 enters the cylinder 20 to an extrusion head 27 at the exit end of the cylinder 20. The diameter of a root 28 of the stock screw 21 is made small near the entrance end of the cylinder 20 and increases progressively toward the exit end thereof so that the compound 10 is first compacted and then softened and worked vigorously until it becomes a viscous fluid and flows easily.

The extrusion head 27 includes a suitable extrusion die (not shown) through which the elongated filamentary conductor 17 is passed along a horizontal path and transversely with respect to the axis of the cylinder 20. In passing through the axial center of the die in the head 27, the conductor 17 is enveloped by the covering 16 of the flowing plastic compound to form the insulated conductor 15. The conductor 17 is advanced continuously through the extrusion head 27 by a conventional capstan (not shown) and the resultant finished insulated conductor 15 is taken up on a conventional takeup apparatus (not shown).

In order to cause the covering 16 extruded upon the conductor 17 to be cellular, a liquefied, normally-gaseous expanding medium is absorbed in the granular organic plastic compound 10. An expanding medium that is very useful for the purposes of the invention is dichlorodifluoromethane. This compound is normally-gaseous, that is, it is a vapor at ordinary temperatures and pressures, but it is readily condensed into liquid form.

Figure 2:
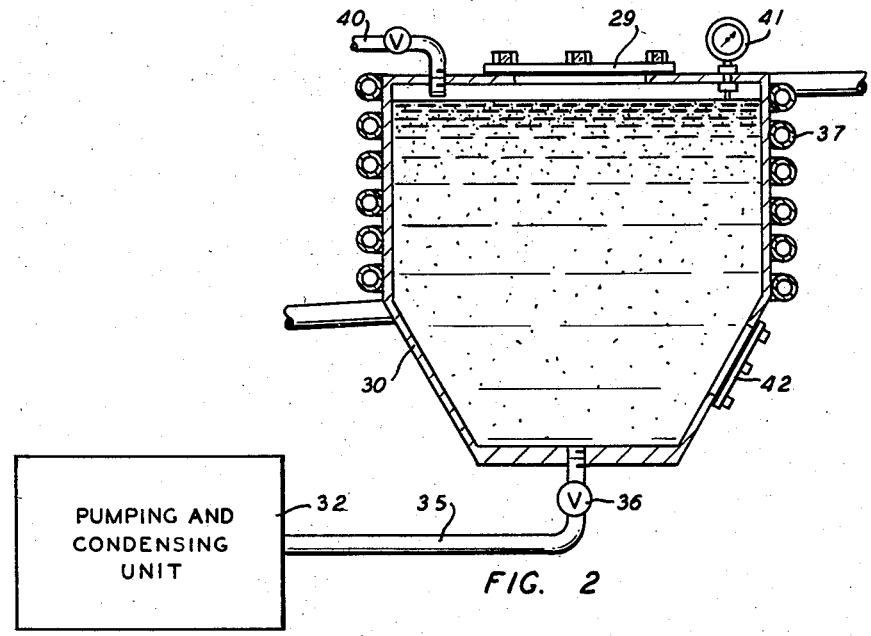
Fig. 2 illustrates diagrammatically a form of apparatus suitable for carrying out certain other steps of methods embodying the invention.

In order to produce the granular organic compound having the expanding medium absorbed therein, apparatus such as that illustrated in Fig. 2 may be employed. With this apparatus, granules of the plastic compound 10, such as polyethylene, are introduced through a charging door 29 into a container 30 capable of being made gas tight. After the granules are introduced into the container 30 to a predetermined level, the charging door 29 is closed to seal the interior of the chamber from the atmosphere. A supply of the liquefied, normally-gaseous expanding medium such as liquid dichlorodifluoromethane, is introduced into the container 30 from a pumping and condensing unit 32 through a supply pipe 35 equipped with a valve 36. When the desired amount of the liquefied expanding medium has been introduced, the valve 36 is closed.

The plastic granules will absorb a certain amount of the liquefied expanding medium, the amount absorbed depending, among other things, upon the temperature of the plastic granules. As the temperature is increased, the ability of the plastic granules to absorb the liquefied expanding medium is increased. To increase the ability of the plastic granules to absorb the liquefied expanding medium, a heating medium is passed through a heat exchange coil 37 surrounding the container 30 to heat the plastic granules and the liquefied expanding medium to a predetermined temperature.

When polyethylene and liquefied dichlorodifluoromethane are employed, the temperature range to which these materials may be elevated is between 70° F. and 180° F., depending upon the amount of the liquefied expanding medium that is desired to be absorbed in the granules. A wide range of amounts of the liquefied expanding medium capable of being absorbed in the plastic granules is obtained from this temperature range and no fusing of the granules or vaporization of the liquefied expanding medium takes place.

The temperature to which the materials are elevated and the time that the liquid expanding medium is allowed to soak into the plastic granules will determine the degree of absorption of the medium into the granules. In turn, the amount of expansion of the covering 16 is determined by this degree of absorption.

After the plastic granules within the container 30 have been treated by the liquefied expanding medium for the predetermined length of time at the predetermined temperature, the valve 36 is opened and the pumps within the unit 32 are actuated to withdraw from the container 30 any of the liquefied expanding medium that has not been absorbed by the plastic granules. During this operation, the heating medium within the coil 37 is also withdrawn and a cooling medium is passed therethrough to decrease the temperature of the granules and the liquefied expanding medium absorbed therein.

When the dichlorodifluoromethane is absorbed in polyethylene, the temperature is lowered to approximately −60° F., which is just above the temperature at which dichlorodifluoromethane freezes. At this temperature, the vapor pressure of the dichlorodifluoromethane is substantially zero, and the dichlorodifluoromethane absorbed within the polyethylene will not tend to escape therefrom. Under these conditions, the plastic granules with the liquefied expanding medium absorbed therein can be stored within the container 30 at the lowered temperature until it is desired to introduce the materials into the extruder 11.

When the dichlorodifluoromethane absorbed in the granular plastic compound 10 is held at a temperature of −60° F., there is virtually no tendency for the gas to escape from the plastic granules. However, to insure that none of the liquid expanding medium escapes from the treated plastic granules, a gas, such as nitrogen, may be introduced into the container 30 through a supply pipe 40 to maintain a predetermined pressure on the granules. The pressure maintained thereon can be determined by a gauge 41. A gas such as nitrogen is desirable since at −60° F., there will be no tendency for the nitrogen to be absorbed in the treated granules and nitrogen is a vapor at this temperature.

When it is desired to cover the filamentary conductor 17 with the cellular covering 16, the treated plastic granules in the cooled condition are introduced into the feed hopper 12 of the extruder 11. A discharge port 42 (Fig. 2) is provided on a lower side of the container 30 to withdraw the treated granules therefrom. However, any arrangement whereby the treated granules are not exposed to the atmosphere in conveying the compound from the container 30 to the feed hopper 12 may be used. For example, an enclosed system connected between the discharge port 42 and the feed hopper 12, whereby the treated granules are maintained in their cooled condition may be provided if desired.

When the treated granular plastic compound 10 with the liquefied expanding agent absorbed therein is fed into the feed hopper 12 and to the extrusion cylinder 20, the compound is advanced from the entrance end of the cylinder into the extrusion head 27 at the exit end thereof. The portion of the stock screw 21 at the entrance end of the extrusion cylinder 20 compacts the treated compound near this end and advances it toward the extrusion head 27. As the compound 10 is advanced toward the extrusion head, the progressively increasing diameter of the root 28 causes the compound 10 to be worked vigorously and this working, together with the temperature control means within the extrusion cylinder 20 and the stock screw 21 brings the treated compound to a viscous fluid condition.

Figure 3:
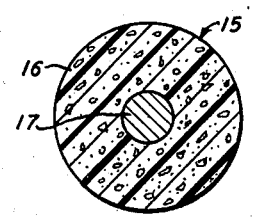
Fig. 3 is a cross-sectional view of a conductor insulated with a cellular plastic, such as is produced by practicing methods embodying the invention.

The increased diameter of the root and the heating of the liquefied expanding agent within the compound 10 cause great pressures to be generated within the extrusion cylinder 20. Since the compound is compacted tightly near the entrance end of the cylinder 20, no gas can escape through the compound and the feed hopper 12. The compound 10, in its viscous fluid condition, is then extruded as the covering 16 onto the continuously moving filamentary core 17 which is passing continuously through the extrusion head 27. As the insulated conductor 15 emerges from the extrusion head 27 into the atmosphere, the pressure thereon is released suddenly. As a result, the expanding medium which is at a high temperature and is entraped in the plastic compound under high pressure, expands instantly and converts the covering 16 into a cellular product, as shown in Fig. 3. The conductor 17 is thereby covered with a concentric covering 16 consisting of small, discrete and uniformly-distributed cells of gaseous material.

While in the foregoing description polyethylene has been mentioned as the plastic material employed to produce cellular plastic products, this invention is not restricted to the use of polyethylene as the plastic material. Instead of polyethylene, plasticized polystyrene, nylon, polyvinyl chloride, copolymers of vinyl chloride and vinyl acetate, or other suitable thermoplastic materials may be used to form cellular plastic products, such as conductors insulated with cellular insulation.

Nitrogen has been mentioned as one form of gas that might be used to prevent the escape of the liquefied expanding medium from the plastic granules. In place of nitrogen, other elements, compounds or mixtures which are gaseous at the relatively low temperature of the treated mixture, for example −60° F., and which are also relatively inert with respect to the treated mixture may be used for this purpose. Among the other gases that might be employed with satisfactory results are argon, neon and helium.

In addition, other liquefied, normally-gaseous organic compounds may be used to expand the plastic compound. The important features of the type of material most suitable for this purpose are that, while it is a vapor at ordinary temperatures and pressure, it may be easily liquefied and the temperature of the plastic compound into which it is to be absorbed may be elevated to increase such absorption without fusing the plastic compound or reaching the critical temperature of the liquefied, normally-gaseous compound.

Among the most important of such gases that may be used in addition to the dichlorodifluoromethane described above, dichlorofluoromethane, dichlorotetrafluoroethane, difluorochloroethane, 1,1-difluoroethane, trichlorofluoromethane, ethyl chloride, methyl bromide and methyl chloride. Other normally-gaseous compounds that may be employed are acetylene, ammonia, butadiene, butane, butene, carbon dioxide, cyclopropane, dimethylamine, 2,2-dimethylpropane, ethane, ethylamine, ethylene, isobutane, isobutylene, methane, monomethylamine, propane, propylene and trimethylamine. While this latter group can be employed theoretically some may be difficult to use practically since they are a danger to health and safety. All of the aforementioned gases, however, are intended to be embraced within the term "liquefied, normally-gaseous expanding medium," as used herein and in the annexed claims.

While in the foregoing description, specific reference has been made to a particular method embodying the invention, other suitable methods may be devised by persons skilled in the art without departing from the spirit and scope of the invention.

What is claimed is:

1. The method of absorbing and retaining expanding media in thermoplastic materials, which comprises heating under pressure granules of a thermoplastic resin with a liquefied, normally-gaseous expanding medium to cause a predetermined amount of the liquefied expanding medium to be absorbed into the solid granules, and cooling the treated granules to a temperature below the boiling point of the expanding medium at atmospheric pressure to cause the absorbed expanding medium to be retained in the granules.

2. The method of absorbing and retaining a predetermined amount of a liquefied, normally-gaseous expanding medium into granules of a thermoplastic resin, which comprises the steps of mixing in a container granules of the resin with the expanding medium in liquid form, sealing the container to prevent substantial vaporization of of the liquid, heating the mixture to a temperature below both the critical temperature of the liquid and the interfusion temperature of the granules to increase the ability of the solid granules to absorb the liquid, maintaining the heated condition to soak the granules in the liquid until the desired amount of the liquid has been absorbed into the solid granules, and then cooling the treated granules to a temperature below the boiling point of the liquid at atmospheric pressure to cause the absorbed expanding medium to be retained in the granules.

3. The method of absorbing and retaining a predetermined amount of a liquefied, normally-gaseous expanding medium into granules of a thermoplastic resin, which comprises the steps of mixing in a container granules of the resin with the expanding medium in liquid form, sealing the container to prevent substantial vaporization of the liquid, heating the mixture to a temperature below both the critical temperature of the liquid and the interfusion temperature of the granules to increase the ability of the solid granules to absorb the liquid, maintaining the heated condition to soak the granules in the liquid until the desired amount of the liquid has been absorbed into the solid granules, withdrawing from the contianer any excess liquid that has not been absorbed into the granules, cooling the treated granules to a temperature below the boiling point of the liquid at atmospheric pressure to cause the absorbed expanding medium to be retained in the granules, and then placing the cooled granules under a positive pressure of an inert gas to insure that the liquid medium will remain absorbed in the granules.

4. The method of treating granules of an extrudable thermoplastic resin with a liquefied, normally-gaseous expanding medium and feeding the treated granules to an extrusion operation of the type wherein the treated granules are first fluidized and then extruded into cellular form, which method comprises the steps of introducing granules of the thermoplastic resin into a container, introducing the expanding medium in liquid form into the the container, sealing the container to prevent substantial vaporization of the liquid, heating the mixture to a temperature below both the critical temperature of the liquid and the interfusion temperature of the granules to increase the ability of the granules to absorb the liquid, maintaining the heated condition to soak the granules in the liquid until a desired amount of the liquid has been absorbed into the granules, withdrawing from the container any excess liquid that has not been absorbed into the granules, cooling the treated granules to a temperature below the boiling point of the liquid at atmospheric pressure, and then feeding the cooled, treated granules to the extrusion operation.

5. The method of making cellular products, which comprises introducing granules of a thermoplastic resin into a container, supplying a liquefied, normally gaseous expanding medium to be absorbed in the granules to the container, elevating the temperature of the granules to increase the rate of absorption of the liquefied expanding medium therein, subsequently cooling the granules treated with the expanding medium to a temperature at which the vapor pressure of the expanding medium is substantially zero and the expanding medium will be retained in the granules, introducing the treated granules into an extrusion cylinder, advancing the granules along the extrusion cylinder while working them under high pressure so that the expanding medium is admixed thoroughly with the thermoplastic resin, extruding the resulting mixture on a continuously-advancing core of indefinite length, and releasing the pressure on the extruded material whereupon the entrapped expanding medium expands the covering into a cellular state.

6. The method in accordance with claim 1, in which the thermoplastic resin employed is a member of the group consisting of polyethylene, plasticized polystyrene, nylon, polyvinyl chloride and copolymers of vinyl chloride and vinyl acetate.

7. The method in accordance with claim 4, wherein the thermoplastic resin is polyethylene and the liquefied, normally-gaseous expanding medium is selected from the group consisting of dichlorodifluoromethane, chlorodifluoromethane, dichlorofluoromethane, dichlorotetrafluoroethane, difluorochloroethane, 1,1 - difluoroethane and trichlorofluoromethane.

8. The method in accordance with claim 5, wherein the thermoplastic resin is selected from the group consisting of polyethylene, plasticized polystyrene, nylon, polyvinyl chloride and copolymers of vinyl chloride and vinyl acetate.

9. The method in accordance with claim 8, wherein the liquefied, normally-gaseous expanding medium is selected from the group consisting of dichlorodifluoromethane, chlorodifluoromethane, dichlorofluoromethane, dichlorotetrafluoroethane, difluorochloroethane, 1,1-difluoroethane and trichlorofluoromethane.

10. The method of forming a cellular polyethylene sheath on a core, which comprises the steps of mixing granular polyethylene with liquefied dichlorodifluoromethane to be absorbed into the polyethylene granules, heating the mixture to between 70° F. and 180° F. to increase the rate of absorption of the dichlorodifluoromethane into the granules, subsequently cooling the treated granules to a temperature at which the vapor pressure of dichlorodifluoromethane is substantially zero so that the absorbed dichlorodifluoromethane will be retained in the polyethylene granules, introducing the cooled treated granules into an extrusion cylinder, advancing the granules along the extrusion cylinder while working them under high pressure so that the dichlorodifluoromethane is admixed thoroughly with the polyethylene, extruding the resulting mixture on a continuously advancing core of indefinite length, and releasing the pressure on the extruded material whereupon the absorbed dichlorodifluoromethane expands the polyethylene into a cellular sheath about the core.

References Cited in the file of this patent
UNITED STATES PATENTS

| | | |
|---|---|---|
| 2,023,204 | Munters et al. | Dec. 3, 1935 |
| 2,531,665 | Booth | Nov. 28, 1950 |
| 2,515,250 | McIntire | July 18, 1950 |
| 2,779,062 | Stastny | Jan. 29, 1957 |

OTHER REFERENCES

Higgins: "Cellular Polyethylene by Extrusion," Plastics Engineering, March 1954, pp. 90, 100, 102, 104.